United States Patent [19]

Dahlberg

[11] Patent Number: 4,912,610
[45] Date of Patent: Mar. 27, 1990

[54] ABRASIVE RESISTANT AIRFIELD MARKER LIGHT

[75] Inventor: Anders I. Dahlberg, Täby, Sweden

[73] Assignee: Raytech Optics AB, Taby, Sweden

[21] Appl. No.: 297,282

[22] PCT Filed: Jul. 6, 1987

[86] PCT No.: PCT/SE87/00323
§ 371 Date: Jan. 9, 1989
§ 102(e) Date: Jan. 9, 1989

[87] PCT Pub. No.: WO88/00156
PCT Pub. Date: Jan. 14, 1988

[30] Foreign Application Priority Data

Jul. 7, 1986 [SE] Sweden .............................. 8603028

[51] Int. Cl.⁴ .............................................. F21V 15/00
[52] U.S. Cl. ................................. 362/153.1; 362/364; 362/376
[58] Field of Search ............... 362/145, 153, 364, 308, 362/309, 331, 332, 337, 376; 340/947, 953, 954

[56] References Cited

U.S. PATENT DOCUMENTS 1,267,967  5/1918  Brunnworth et al. ............... 362/364
3,535,504 10/1970  Beal et al. ........................... 362/309
4,112,485  9/1978  Sutter .................................. 362/369
4,394,715  7/1983  Dahlberg ............................. 362/145

FOREIGN PATENT DOCUMENTS 698355 10/1953 United Kingdom ................ 362/364
710608  6/1954 United Kingdom ................ 362/364
759848 10/1956 United Kingdom ................ 362/364

Primary Examiner—Ira S. Lazarus
Assistant Examiner—Richard R. Cole
Attorney, Agent, or Firm—Pollock, Vande Sande & Priddy

[57] ABSTRACT

An airfield marker light, e.g., for runways or taxi strips, comprising a casing (1) with a lower light source (4) and an upper, transparent cover plate (8) situated substantially in the ground plane. An abrasive resistant material, preferably in the form of particles partially embedded into the surface of the cover plate, protrudes upwardly from the cover plate exclusively in at least one dead zone (11, 12, 13), which does not emit any light. The hard material protects the cover plate (8) against mechanical abrasion, for example during snow-clearance by steel scrapers.

8 Claims, 2 Drawing Sheets

ABRASIVE RESISTANT AIRFIELD MARKER LIGHT

FIELD OF THE INVENTION

The invention relates to an airfield marker light, e.g., for runways or taxi strips, comprising a casing to be flush-mounted in the ground and having an upper, at least partially transparent cover plate with an upper, substantially planar surface to be placed substantially flush with the ground plane, wherein the casing includes at least one light source and optical means so adapted that one or more light beams are emitted from at least one portion of the cover plate, said portion constituting an active zone, whereas at least one other portion of the cover plate constitutes a dead zone, from which no light is emitted.

BACKGROUND OF THE INVENTION

Such marker lights of the flush-mounted type are previously known, e.g. from SE-C-7803611-8 DK-C-113 912 and EP-B1-22106. The flush-mounted type has of course the advantage that the marker light does not have any protruding portions, and it can therefore be located at will on or adjacent to a runway or a taxi strip and can be run over by the wheels of air craft or other vehicles.

However, a problem in this connection is the cleaning and the snow-clearance of the runways, which requires the use of steel scrapers on the cleaning vehicles in order to obtain the desired result, especially when ice is present, which is often the case due to the heat emitted by the light device. Such steel scrapers often cause scratches and other damage to the upper, light emitting surface of the cover plate. In order to prevent such damages, it is proposed in the above mentioned SE-C-7803611-8 that hard particles be embedded into the light emitting, active zone of the cover plate, these particles protruding upwardly somewhat above the transparent material. Hereby, the light emitting, active zone of the cover plate is of course protected from damage in connection with snow-clearance by means of steel scrapers, but the hard particles inevitably cause an undesirable reduction of the light intensity and uncontrollable diffuse spreading of the emitted light.

SUMMARY OF THE INVENTION

The object of the present invention is to avoid this problem and to obtain an abrasive resistant marker light without impairing the light emitting properties thereof.

This object is achieved according to the invention in that an abrasive resistant material, which is substantially harder than the transparent material of the cover plate, protrudes upwardly from the cover plate exclusively in at least one dead zone, which crosses and/or confines the major part of the cover plate. Such dead zones, which do not emit any light, can extend as a strip across the cover plate and/or along at least a portion of the periphery of the cover plate. Hereby, the desired mechanical protection is achieved, while the emitted light is in no way disturbed by the hard material, which is preferably constituted by particles partially embedded into the surface of the cover plate.

BRIEF DESCRIPTION OF THE DRAWINGS

Further advantageous features will appear from the following detailed description of a preferred embodiment, reference being made to the appended drawings, in which.

DETAILED DESCRIPTION

Figure 1:
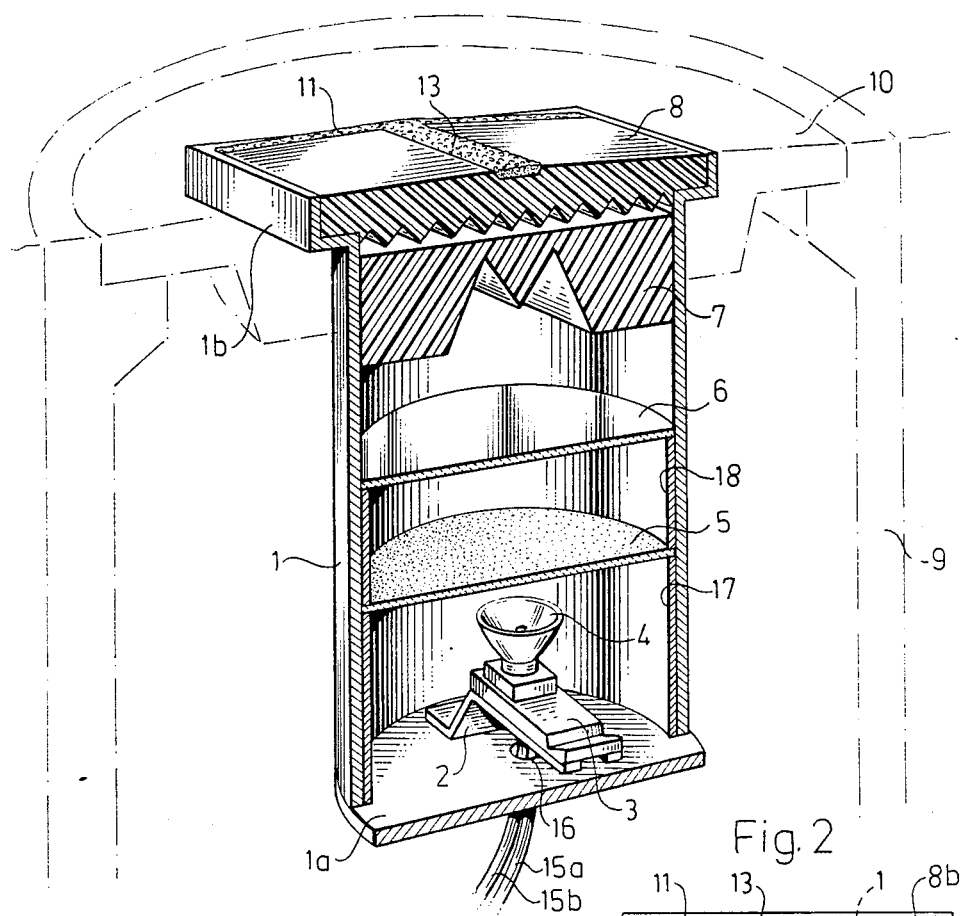
FIG. 1 shows a marker light according to the invention in perspective view, partly in section.
Figure 2:
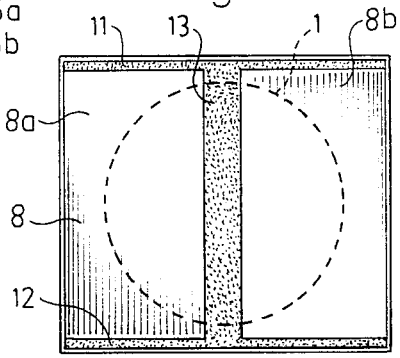
FIG. 2 is a top plan view of the marker light.

The marker light shown in FIGS. 1 and 2 comprises essentially a cylindrical metal casing 1 with a lower bottom plate 1a and an upper, substantially rectangular seat 1b, a reflector lamp 4 mounted at the bottom on a bracket 2, 3, a color filter 5, a transparent insulating plate 6, a light refracting plate 7 and an upper, transparent cover plate 8 fitted tightly into the seat 1b. As indicated in FIG. 1, the casing 1 is mounted in a well housing 9 with a lid 10, so that the upper surface of the cover plate 8 lies substantially in the ground plane.

Figure 3:
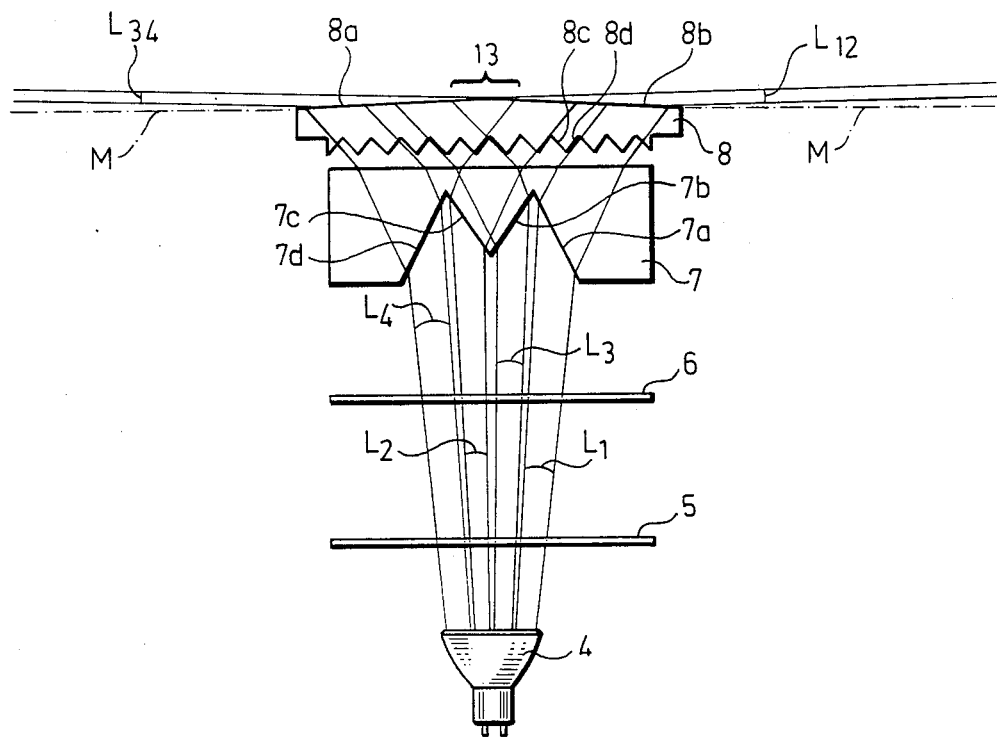
FIG. 3 shows the optical components schematically with their principal light rays.

The upper, substantially rectangular cover plate 8 is preferably made of a transparent epoxy plastic material, i.e., a relatively abrasive resistant material, which, if necessary, can be provided with a fresh surface layer to fill in possible scratches or other damage on the upper surface. In order to avoid such damage, according to the invention, hard particles are embedded in the surface layer, partly along two longitudinal edge portions 11, 12, partly along a central, transversal strip portion 13. Hereby, the upper surface of the cover plate is divided into two rectangular portions 8a, 8b, each emitting a light beam, which propagates closely along the ground plane (compare cf. FIG. 3). In order to obtain the best possible light intensity near the ground plane, each surface portion 8a, 8b is somewhat downwardly inclined from the central, transversal portion 13 about 3° relative to the horizontal plane.

The longitudinal edge portions 11, 12 and the central, transversal strip portion 13 of the cover plate 8 constitute "dead zones" in the sense that no light is emitted therefrom. However, these zones are located in such a way in relation to the "active zones" 8a, 8b, that they cross and partially confine the major part of the cover plate 8, so that a steel scraper on a snow-clearance vehicle, irrespective of the orientation of the steel scraper (it is assumed that the steel scraper has a substantially greater extension lengthwise than the dimensions of the cover plate), will not contact the active light emitting surface portions 8a, 8b. The hard particles in the dead zones 11, 12, 13 are partially embedded in such a way that they partially protrude upwards from and have their upper edges situated slightly above the surface of the cover plate.

The hard particles are preferably granular and can be constituted by a mineral, a hard metal, a sintered metal or a ceramic material. Alternatively, a unitary strip of such material can be applied onto the respective "dead zone".

The configuration of the dead zones with embedded particles or some other hard material can be modified by those skilled in the art.

What is claimed is:

1. An airfield marker light comprising a casing (1) to be flush-mounted in the ground and having an upper, at least partially transparent cover plate (8) with an upper substantially planar surface to be placed essentially flush with the ground plane, wherein the casing includes at least one light source (4) and optical means (7, 8) so adapted that at least one light beam ($L_12$, $L_34$) is emitted from at least one portion (8a, 8b) of the cover plate, said portion constituting an active zone, whereas at least one other portion (11, 12, 13) of the cover plate constitutes a dead zone, from which no light is emitted, wherein an abrasive resistant material, which is substantially harder than the transparent material of the cover plate, protrudes upwardly from the cover plate exclusively in at least one dead zone (11, 12, 13), which crosses and/or confines the major part of the cover plate (8).

2. Marker light according to claim 1, wherein said abrasive resistant material consists of particles partially embedded in the surface of the cover plate (8).

3. Marker light according to claim 1 or 2, wherein at least one dead zone (11, 12) with said abrasive resistant material extends along at least a portion of the periphery of the cover plate (8).

4. Marker light according to claim 1 or 2, wherein at least one dead zone (13) with said abrasive resistant material extends as a strip across the cover plate (8).

5. Marker light according to claim 4, wherein the cover plate includes two active zones (8a, 8b), which emit light in opposite directions, said two active zones (8a, 8b) being separated by said dead zone (13) in strip form.

6. Marker light according to claim 5, wherein the two active zones (8a, 8b) are confined at opposite sides thereof by two longitudinal, common dead zones (11, 12) with said abrasive resistant material, so that the dead zones (11, 12, 13) with said abrasive resistant material together form a configuration corresponding to the letter H.

7. Marker light according to claim 5, wherein the two active zones (8a, 8b) are somewhat downwardly inclined from said strip-shaped dead zone (13).

8. Marker light according to claim 7, wherein the two active zones (8a, 8b) are confined at opposite sides thereof by two longitudinal, common dead zones (11, 12) with said abrasive resistant material, so that the dead zones (11, 12, 13) with said abrasive resistant material together form a configuration corresponding to the letter H.

* * * * *